United States Patent [19]

Annegarn et al.

[11] Patent Number: 4,905,076
[45] Date of Patent: Feb. 27, 1990

[54] THREE DIMENSIONAL TELEVISION SYSTEM AND PROJECTION TELEVISION RECEIVER

[75] Inventors: Marcellinus J. J. C. Annegarn; Sing L. Tan, both of Eindhoven, Netherlands; David A. Cammack, White Plains, N.Y.; Douglas A. Stanton; Rameshwar N. Bharagava, both of Ossining, N.Y.

[73] Assignee: N.A. Philips & U.S. Philips Corporation, New York, N.Y.

[21] Appl. No.: 895,961

[22] Filed: Aug. 12, 1986

Related U.S. Application Data

[63] Continuation-in-part of Ser. No. 472,372, Mar. 4, 1983, abandoned.

[51] Int. Cl.[4] .............................................. H04N 15/00
[52] U.S. Cl. .......................................................... 358/3
[58] Field of Search ...................................... 358/3, 92

[56] References Cited

U.S. PATENT DOCUMENTS

| 3,596,988 | 3/1971 | Schmidt | 358/3 |
| 4,281,341 | 7/1981 | Byatt | 358/92 |
| 4,399,456 | 8/1983 | Zalm | 358/92 |
| 4,504,856 | 3/1985 | Jackman | 358/92 |

FOREIGN PATENT DOCUMENTS 56-31293  3/1981  Japan .................................... 358/3

Primary Examiner—John W. Shepperd
Attorney, Agent, or Firm—Robert T. Mayer

[57] ABSTRACT

A three dimensional projection television system in which the screen of the receiver alternatively receives a television picture field as polarized by polarizing apparatus and a television picture field which is orthogonally polarized with respect to the fields polarized by the polarizing apparatus. Also disclosed in a receiver for use in such a system. The receiver includes three projectors each projecting through a polarizer and an individual electro-optical crystal device.

15 Claims, 2 Drawing Sheets

THREE DIMENSIONAL TELEVISION SYSTEM AND PROJECTION TELEVISION RECEIVER

This is a continuation-in-part of co-pending application Ser. No. Mar. 4, 1983, now abandoned.

This is an invention in television. More particularly it involves a three dimensional projection television system and a receiver for use in such a system.

A three dimensional TV projection system is disclosed in SPIE, Volume 199, Advances in Display Technology, 1979, Pages 42–46. That system was deficient in that it required two projection devices for creating the 3D image. Moreover, in order to transmit 3D images produced by that system it would be necessary to double the bandwidth that is used in standard television transmission.

It is an object of this invention to provide an improved three dimensional television system.

It is another object of this invention to provide a television receiver for use in a three dimensional projection television system.

One of the features of the invention is that it provides a three dimensional image on a projection television set with one projection device.

One of the advantages of the television system disclosed herein is that the 3D images it produces can be transmitted using the same bandwidth used in transmitting standard television. As a consequence, a standard commercially available video tape recorder can be used to store and playback the television picture signals produced by the system.

In carrying out the invention, there is provided a three dimensional projection television system including signal means for producing television picture signals which alternate field by field between those generated by one camera at one predetermined location and those generated by a second camera at a different predetermined location. A projection television receiver having red, green and blue projectors and a screen is connected to the signal means. The receiver receives the picture field signals and projects the associated fields on its screen. Polarizing apparatus is disposed in front of the screen. The fields are transmitted through the polarizing apparatus. Also disposed in front of the screen is electro-optical apparatus. The electro-optical apparatus includes a separate electro-optical crystal device for each projector. The fields are also transmitted through the electro-optical crystal devices. Control means are connected to the electro-optical crystal devices to control their characteristics from field to field so that the screen alternately receives a field polarized by the polarizing apparatus and a field which is orthogonally polarized with respect to the field polarized by the polarizing apparatus. In this way a viewer viewing the screen through glasses, the lenses of which are appropriately orthogonally polarized with respect to each other perceives the screen to be providing a three dimensional image.

Other objects, features and advantages of the invention will be apparent to those skilled in the art from the following description and appended claims when considered in conjunction with the accompanying drawing, in which FIG. 1 is a representative illustration of a television system according to the invention;

Figure 1:
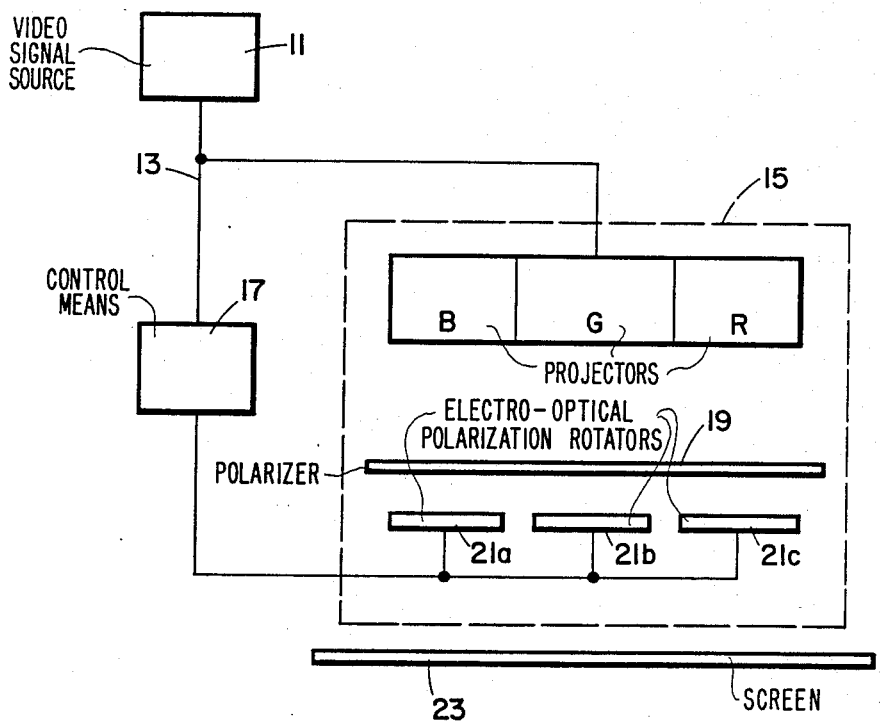
Figure 1:
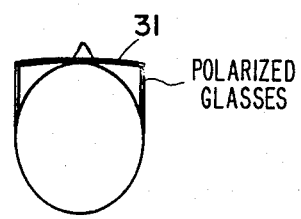

Signal means 22 (FIG. 1) produces television picture signals which alternate field by field between those generated by one camera at one predetermined location and those generated by a second camera at a different predetermined location. Signal means 11 is connected to transmission system 13. The transmission system is connected to projection apparatus 15 and control means 17. Projection apparatus 15 includes blue, green and red projectors B, G and R. These are mounted in back of polarizer means 19. Disposed in front of polarizer means 19 are three electro-optical polarization rotation devices 21a, 21b, and 21c, one for each of the three projectors. Each electro-optical device is made of lanthanum modified lead zirconate titanate. Control means 17 produces control signals for controlling the characteristics of devices 21a, 21b and 21c. In particular, the control signals change the optical characteristics of devices 21a, 21b and 21c so that they rotate the polarization of every alternate field as polarized by polarizer means 19 by ninety degrees. Alternate fields, therefore, are orthogonally polarized with respect to each other. Television screen 23 is disposed in front of electro-optical devices 21a, 21b and 21c to receive the images projected by the blue, green and red projectors B, G and R of projecting apparatus 15.

Screen 23 is chosen so that it does not disturb the polarization of the fields projected on it. One such type screen is made of gray rear screen projection material sold by Rosco, Inc., of Port Chester, N.Y. under its part no. 2100.

Figure 2:
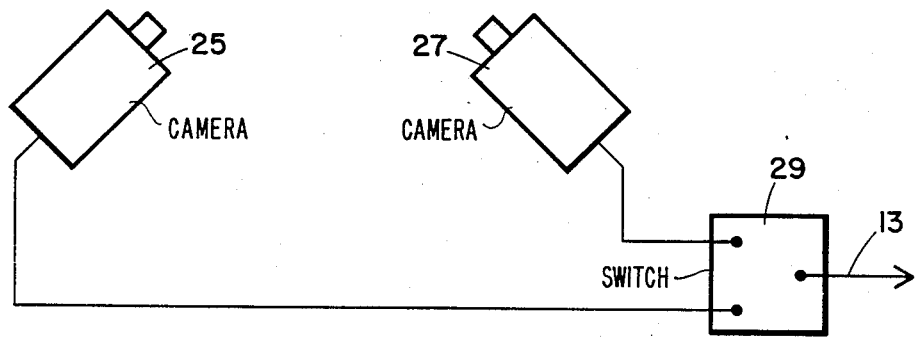
FIG. 2 is a representative illustration of a means for producing picture signals for the television system of FIG. 1.

FIG. 2 shows one embodiment of apparatus suitable for producing the signals desired from signal means 11 of FIG. 1. This apparatus includes camera 25 disposed at a predetermined location to view a scene (not shown) at a particular angle. Camera 27 disposed at a different predetermined location as shown can view the same scene as camera 25 but from a different angle. The picture signals of both camera 25 and camera 27 are applied to switch 29. This responds to the vertical synchronization signals produced by each of the cameras to apply to transmission system 13 the picture field signals received from the cameras alternately field by field. As an alternative, signal means 11 could be a video tape recorder with a tape which has stored on it previously recorded outputs from switch 29.

Assuming signal means 11 of FIG. 1 includes the apparatus of FIG. 2, the system operates by producing television picture signals which alternate field by field between those generated by camera 25 and those generated by camera 27. These signals are applied along transmission system 13 to projection apparatus 15 and to control means 17. Control means 17 responds to the vertical synchronization signals transmitted along transmission system 13 to produce control signals which cause electro-optic polarization rotators 21a, 21b and 21c to rotate the polarization of alternate fields by ninety degrees. In this way projection means 15 alternately projects onto screen 23 a field as polarized by polarizer 19 and a field which is orthogonally polarized with respect to frames polarized by polarizer 19. As a consequence a viewer viewing the screen through eyeglasses 31 having a pair of lenses which are appropriately orthogonally polarized with respect to each other perceives the screen to be providing a three dimensional image.

In the illustrated system polarizer means 19 and electro-optical devices 21a, 21b and 21c are shown between projectors B, G and R and screen 23. This was done to simplify the disclosure. As those skilled in the art will understand the polarizer means and rotation devices may be disposed anywhere between the phosphor emitting surface of the television set and the screen. In the constructed embodiment hereinbefore disclosed there were disposed between lenses of the projection apparatus. As a result it is to be understood that an identical but separate polarizer was used for each projector as opposed to a common one as illustrated.

An embodiment of a receiver constructed in accordance with the invention included an altered Mitsubitshi Model No. VE45OR. This receiver used four inch electro-optical crystal devices such as described in the 1979 IEEE International Symposium on Applications of Ferroelectrics, Session 10. The three particular crystal devices used were identical and made KCG14042 by Honeywell, Inc., at the Honeywell Ceramics Center, Underseas System Division, 5121 Winnetka Avenue, New Hope, Minnesota 55428, as 4 inch PLZT electrooptic modulators. The altered receiver used a first or front surfaced mirror and had its screen replaced by a non-stressed screen to reduce screen induced birefringence. The particular screen used was made by the Scan Screen Company of Denmark and was their Model No. 12178.

Figure 3A:
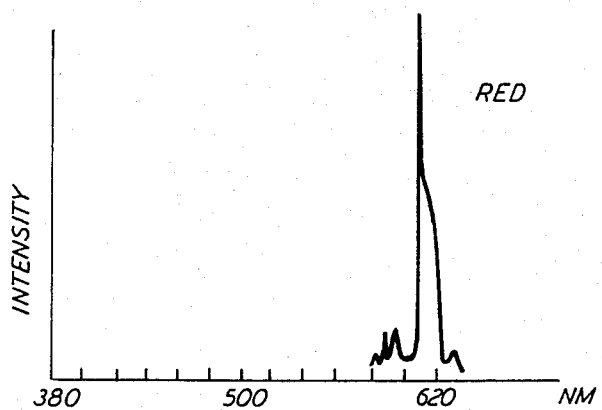
FIGS. 3A, 3B and 3C are graphs of the intensity of the output of the red, green and blue projectors of a constructed embodiment of the invention plotted against wavelength.
Figure 3B:
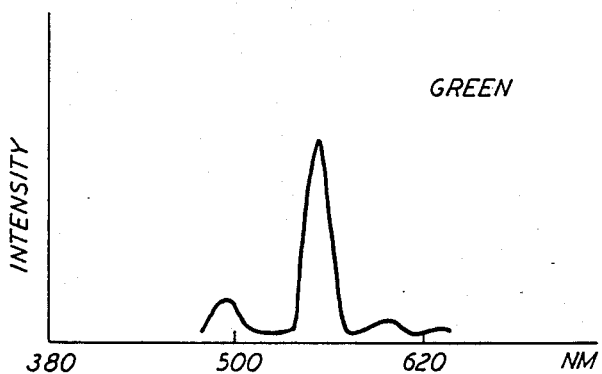
Figure 3C:
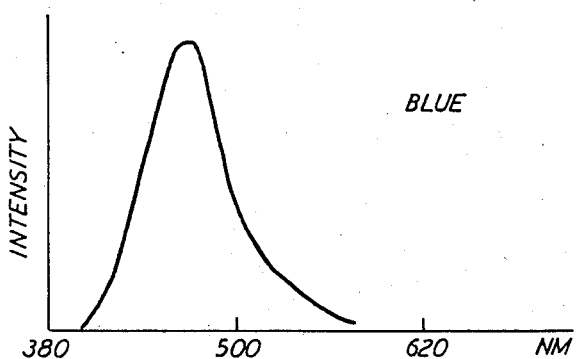

The particular projection television set used in this constructed embodiment was so selected because its red and green projectors both have narrow bandwidths at high intensity. The blue projector is not quite as narrow but since blue light is the least important in the perception of a viewer it is not as important that it have as narrow a bandwidth. As can be seen from FIGS. 3A, 3B and 3C the red projector peaked in intensity at about 615 nanometers rising sharply at 610 nanometers and falling just as sharply at 620 nanometers. The green projector peaked in intensity at approximately 550 nanometers rising at 540 nanometers and falling at 560 nanometers. The blue projector peaked at about 460 nanometers but rose to that peak from approximately 400 nanometers and fell to a low at about 560 nanometers.

To get good extinction of alternate fields in the right and left eyes of a viewer wearing suitably polarized glasses, the planes of polarization of alternate fields were chosen to be parallel and perpendicular to the plane of incidence of the mirror of the receiver. Satisfactory extinction was obtained by applying 760 volts DC to the crystal device in front of the blue projector; 840 volts DC to the crystal device in front of the green projector and 920 volts DC to the crystal device in front of the red projector during every other field and 0 volts to each of the crystal devices during the alternate fields.

It is understood that various other modifications to the above described invention will become evident to those skilled in the art. For that reason the arrangements described are for illustrative purposes only and are not to be considered restrictive.

What is claimed is:

1. A three dimensional projection television system including a pair of television cameras each viewing a scene from different predetermined positions and each generating picture signals which upon receipt by an associated television receiver would produce picture fields on its receiver; a transmission system; a switch receiving the picture signals from each camera, said switch alternately connecting said cameras to said transmission system so that the picture signals received from said cameras alternate field by field between those generated by one camera and those generated by the other, a projection television receiver with red, green and blue projectors and a screen, said receiver receiving said transmitted field signals and projecting the associated fields on said screen; polarizer means disposed in front of said screen, said fields being transmitted through said polarizer means; electro-optical apparatus disposed in front of said screen, said apparatus including a separate electro-optical crystal device for each projector, said fields being transmitted through said electro-optical crystal devices; and control means connected to said electro-optical crystal devices and controlling their characteristics from field to field so that said screen alternately receives a field as polarized by said polarizer means and a field which is orthogonally polarized with respect to the fields polarized by said polarizer means whereby a viewer viewing said screen through glasses, the lenses of which are appropriately orthogonally polarized with respect to each other, perceives the screen to be providing a three dimensional image, said control means applying a different voltage to each of the crystal devices for the red, green and blue projectors during every other field, each said different voltage being different from each other.

2. A three dimensional projection television system according to claim 1, wherein each of said television cameras produces a vertical synchronization signal and said switch responds to each vertical synchronization signal to connect said cameras alternately to said transmission system.

3. A three dimensional projection television system according to claim 2, wherein said control means receives each vertical synchronization signal and responds to each to change the characteristics of said electro-optical crystal devices.

4. A three dimensional projection television system according to claim 3, wherein each device is made of lanthanum modified lead zirconate titanate.

5. A three dimensional projection television system as claimed in claim 4, wherein said control means applies zero voltage to each of the crystal devices for the red, green and blue projectors during fields alternating with the fields during which the different voltages are applied to the crystal devices.

6. A three dimensional projection television system as claimed in claim 5, wherein said screen is a non-stressed one.

7. A three dimensional projection television system including signal means producing television picture signals which alternate field by field between those generated by one camera at one predetermined location and those generated by a second camera at a different predetermined location; a projection television receiver connected to said signal means and having red, green and blue projectors and a screen, said receiver receiving said picture field signals and projecting the associated fields on said screen; polarizer means disposed in front of said screen, said fields being transmitted through said polarizer means; electro-optical apparatus disposed in front of said screen, said apparatus including a separate electro-optical crystal device for each projector, said fields being transmitted through said electro-optical crystal devices; and control means connected to said electro-optical crystal devices and controlling their characteristics from field to field so that said screen alternately receives a field as polarized by said polarizer means and a field which is orthogonally polarized with respect to the fields polarized by said polarizer means whereby a viewer viewing said screen through eyeglasses, the lenses of which are appropriately orthogonally polarized with respect to each other, perceives the screen to be providing a three dimensional image, said control means applying a different voltage to each of the crystal devices for the red, green and blue projectors during every other field, each said different voltage being different from each other.

8. A three dimensional projection television system according to claim 7, wherein said signal means is a video recording device.

9. A three dimensional projection television system according to claim 8, wherein each electro-optical device is made of lanthanum modified lead zirconate titanate.

10. A three dimensional projection television system as claimed in claim 9, wherein said control means applies zero voltage to each of the crystal devices for the red, green and blue projectors during fields alternating with the fields during which the different voltages are applied to the crystal devices.

11. A three dimensional projection television system as claimed in claim 10, wherein said screen is a non-stressed one.

12. A three dimensional projection television receiver comprising a screen; projection apparatus including red, green and blue projectors and polarizer means in front of said screen and electro-optical apparatus in front of said screen; said electro-optical apparatus including a separate electro-optical crystal device for each projector; and control means connected to said electro-optical crystal devices and controlling their characteristics during reception by said receiver so that screen alternately receives a television picture frame as polarized by said polarizer means and a television picture frame which is orthogonally polarized with respect to the frames polarized by said polarizer means whereby a viewer viewing said screen through eyeglasses, the lenses of which are appropriately orthogonally polarized with respect to each other, can perceive the screen to be providing a three dimensional image, said control means supplying a different voltage to each of the crystal devices for the red, green and blue projectors during every other field, each said different voltage being different from each other.

13. A three dimensional projection television receiver according to claim 12, wherein each electro-optical device is made of lanthanum modified lead zirconate titanate.

14. A three dimensional projection television receiver as claimed in claim 13, wherein said control means applies zero voltage to each of the crystal devices for the red, green and blue projectors during fields alternating with the fields during which the different voltages are applied to the crystal devices.

15. A three dimensional projection television receiver as claimed in claim 14, wherein said screen is a non-stressed one.

* * * * *

UNITED STATES PATENT AND TRADEMARK OFFICE
CERTIFICATE OF CORRECTION

PATENT NO. : 4,905,076

DATED : February 27, 1990

INVENTOR(S) : MARCELLINUS J.J.C. ANNEGARN ET AL

It is certified that error appears in the above-identified patent and that said Letters Patent is hereby corrected as shown below:

TITLE PAGE:

Item [75] Change "Bharagava" to --Bhargava--

Signed and Sealed this

Sixteenth Day of July, 1991

Attest:

HARRY F. MANBECK, JR.

*Attesting Officer*      *Commissioner of Patents and Trademarks*

UNITED STATES PATENT AND TRADEMARK OFFICE
CERTIFICATE OF CORRECTION

PATENT NO.   :   4,905,076

DATED        :   February 27, 1990

INVENTOR(S)  :   Marcellinus J.J.C. Annegarn et al

It is certified that error appears in the above-identified patent and that said Letters Patent is hereby corrected as shown below:

col 3, line 23    delete "KCG14042".

Signed and Sealed this

Seventeenth Day of December, 1991

Attest:

HARRY F. MANBECK, JR.

Attesting Officer

Commissioner of Patents and Trademarks